US010866562B2

(12) United States Patent
Kim

(10) Patent No.: US 10,866,562 B2
(45) Date of Patent: Dec. 15, 2020

(54) VEHICLE ONBOARD HOLOGRAPHIC COMMUNICATION SYSTEM

(71) Applicant: DOUBLEME, INC, San Jose, CA (US)

(72) Inventor: Heekwan Kim, San Jose, CA (US)

(73) Assignee: DOUBLEME, INC., San Jose, CA (US)

(*) Notice: Subject to any disclaimer, the term of this patent is extended or adjusted under 35 U.S.C. 154(b) by 56 days.

(21) Appl. No.: 16/020,979

(22) Filed: Jun. 27, 2018

(65) Prior Publication Data

US 2019/0018364 A1  Jan. 17, 2019

Related U.S. Application Data

(63) Continuation-in-part of application No. 15/206,255, filed on Jul. 9, 2016, now Pat. No. 10,516,868.

(51) Int. Cl.
| | |
|---|---|
| *G03H 1/00* | (2006.01) |
| *G06F 3/01* | (2006.01) |
| *G06F 3/0487* | (2013.01) |
| *B60W 50/14* | (2020.01) |
| *G03H 1/02* | (2006.01) |

(Continued)

(52) U.S. Cl.
CPC ......... *G03H 1/0005* (2013.01); *B60W 50/14* (2013.01); *G03H 1/024* (2013.01); *G06F 3/011* (2013.01); *G06F 3/017* (2013.01); *G06F 3/0487* (2013.01); *G06F 3/04845* (2013.01); *H04M 3/567* (2013.01); *B60W 2556/45* (2020.02);

(Continued)

(58) Field of Classification Search
CPC ...... G03H 1/0005; G03H 1/024; G06F 3/017; B60W 50/14
See application file for complete search history.

(56) References Cited

U.S. PATENT DOCUMENTS 9,164,481 B2 * 10/2015 Tsang ................. G03H 1/02
10,317,900 B2 * 6/2019 Kamhi ................. B60W 50/14
(Continued)

*Primary Examiner* — Boubacar Abdou Tchoussou
(74) *Attorney, Agent, or Firm* — Invent Capture, LLC.; Samuel S. Cho

(57) ABSTRACT

A novel vehicle onboard holographic communication system is configured to generate, manage, and display various three-dimensional holographic objects, holographic digital assistance, and dynamically-updatable holographic contents in automotive infotainment, vehicle control, and occupant communication environments. Preferably, the vehicle onboard holographic communication system includes a vehicle infotainment hardware module, a vehicle infotainment operating system (e.g. Apple CarPlay, Android Auto, etc.) and a vehicle onboard holographic communication operating system (e.g. "HoloDash OS") executed in a CPU and a memory unit of the vehicle infotainment hardware module, and a holographic display pod integrated into a vehicle dashboard or another part of the vehicle interior. The in-vehicle holographic display pod provides lifelike high-resolution 3D holographic objects for vehicle occupant infotainment, vehicle control, and communication applications. Furthermore, the vehicle onboard holographic communication system allows in-vehicle holograms to receive and interpret driver or passenger gesture commands with embedded sensors, which enable bilaterally-interactive experiences with the in-vehicle holograms.

7 Claims, 7 Drawing Sheets

A Humanized 3D Holographic Assistant on a "Holo Armrest Pod" Generated by a Vehicle Onboard Holographic Communication System

(51) Int. Cl.
*G06F 3/0484* (2013.01)
*H04M 3/56* (2006.01)
(52) U.S. Cl.
CPC ............... *G03H 2001/0061* (2013.01); *G06F 2203/04806* (2013.01)

(56) References Cited

U.S. PATENT DOCUMENTS

| | | | |
|---|---|---|---|
| 10,573,093 B2* | 2/2020 | Breed | G07C 5/008 |
| 2008/0086240 A1* | 4/2008 | Breed | G07C 5/008 |
| | | | 701/1 |
| 2014/0065520 A1* | 3/2014 | Tsang | G03H 1/02 |
| | | | 430/2 |
| 2016/0085332 A1* | 3/2016 | Herrera-Morales | G02B 27/18 |
| | | | 345/175 |
| 2016/0364003 A1* | 12/2016 | O'Brien | G06F 3/017 |
| 2017/0028866 A1* | 2/2017 | Miller | B60L 58/12 |
| 2017/0329329 A1* | 11/2017 | Kamhi | B60W 50/14 |
| 2018/0046255 A1* | 2/2018 | Rothera | G01S 7/412 |
| 2019/0135109 A1* | 5/2019 | Miller, Jr. | H04L 12/40189 |
| 2019/0253638 A1* | 8/2019 | Wen | G01B 11/245 |

* cited by examiner

A System Block Diagram for a Vehicle Onboard Holographic Communication System
(e.g. "HoloDash", "HoloTube")

200

A Humanized 3D Holographic Assistant on a "Holo Armrest Pod" Generated by a Vehicle Onboard Holographic Communication System

300

A Humanized 3D Holographic Assistant in a "HoloDash Pod" Interface Generated by a Vehicle Onboard Holographic Communication System

400

An Embodiment of a Holographic Sensing-Based User Control Interface (e.g. HoloDash Sense) for a Vehicle Onboard Holographic Communication System An Embodiment of a Holographic Sensing-Based User Control Interface (e.g. HoloDash Sense) for a Vehicle Onboard Holographic Communication System

600

A 3D Gesture-Sensing Method for a Holographic Sensing-Based User Control Interface (e.g. HoloDash Sense) in a Vehicle Onboard Holographic Communication System

700

Examples of 3D Gesture-Sensing Functionalities for a Holographic Sensing-Based User Control Interface (e.g. HoloDash Sense) in a Vehicle Onboard Holographic Communication System

VEHICLE ONBOARD HOLOGRAPHIC COMMUNICATION SYSTEM

INCORPORATION BY REFERENCE

A U.S. non-provisional patent application, U.S. Ser. No. 15/206,255, titled "HoloPortal and HoloCloud System and Method of Operation," and filed on Jul. 9, 2016, is incorporated herein by reference. The present invention is also a continuation-in-part application of U.S. Ser. No. 15/206,255 and thus claims benefit to U.S. Ser. No. 15/206,255.

BACKGROUND OF THE INVENTION

The present invention generally relates to digital holographic image creation and processing. The present invention also relates to autostereoscopic holographic image-based virtual assistants and communication systems. Furthermore, the present invention also relates to a holographic human-vehicle interface, three-dimensional (3D) holographic virtual assistant creation, and novel user communication methods with 3D holographic virtual assistants. More specifically, the present invention relates to one or more novel electronic systems that provide holographic human-vehicle interfaces, vehicle onboard holographic assistants, and user gesture-based communications with vehicle onboard holographic assistants.

Modern electronic devices are increasingly incorporating intelligent computerized assistants in smart device applications as part of man-machine command and communication interfaces. For example, new automotive vehicle designs often incorporate voice commands and high-definition 2D graphics for various automotive infotainment, navigation, and vehicle control applications for driver and passenger entertainment and convenience. Some automotive man-machine interfaces are also configured to capture and process naturalized human language as voice commands and accommodate in-dash Internet web browsing, videoconferencing, or other real-time multimedia communications from an interior of a vehicle.

Although such conventional implementations of various digitized visual and voice assistance in automotive user interfaces have enhanced driver and passenger experience and convenience, today's automotive infotainment, navigation, and control system interfaces are unable to provide visually-humanized and lifelike digital assistants or three-dimensional holographic objects for driver and/or passenger infotainment and communication needs. Furthermore, conventional automotive infotainment systems do not incorporate three-dimensional display or holographic display capabilities that may enhance driver and/or passenger communication, command, and entertainment experiences inside a vehicle.

Therefore, it may be beneficial to provide a novel electronic system that can provide various three-dimensional holographic objects, holographic digital assistance, and dynamically-updatable holographic contents in an automotive infotainment, vehicle control, and occupant communication environments. Furthermore, it may also be beneficial to provide a specialized in-dash holographic pod or another in-vehicle holographic presentation platform that can display lifelike high-resolution holographic objects for driver and passenger infotainment, controls, and communication needs. In addition, it may also be beneficial to provide a novel user gesture-sensing holographic man-machine interface for enabling various gesture commands to holographic objects displayed inside a vehicle.

SUMMARY

Summary and Abstract summarize some aspects of the present invention. Simplifications or omissions may have been made to avoid obscuring the purpose of the Summary or the Abstract. These simplifications or omissions are not intended to limit the scope of the present invention.

In a preferred embodiment of the invention, a novel vehicle onboard holographic communication system is disclosed. This system comprises: a vehicle infotainment hardware module with a CPU and a memory unit; a vehicle infotainment operating system executed in the CPU and the memory unit of the vehicle infotainment hardware module; a vehicle onboard holographic communication operating system executed in the CPU and the memory unit of the vehicle infotainment hardware module, wherein the vehicle infotainment operating system and the vehicle onboard holographic communication operating system are also at least partially executed by a holographic application management server in a cloud-computing environment; a holographic display pod device integrated into at least one of a vehicle dashboard and a vehicle armrest; a holographic virtual reality content browser and a third-party holographic application loader that are configured to load and display various holographic in-vehicle apps downloaded from a third-party holographic application database and an in-vehicle holographic software development kit (SDK) in the cloud-computing environment; and a three-dimensional (3D) hologram displayed from the holographic display pod device integrated into the vehicle dashboard or the vehicle armrest, wherein the 3D hologram provides at least one of vehicle occupant infotainment, vehicle control, and communication assistance.

DETAILED DESCRIPTION

Figure 1:
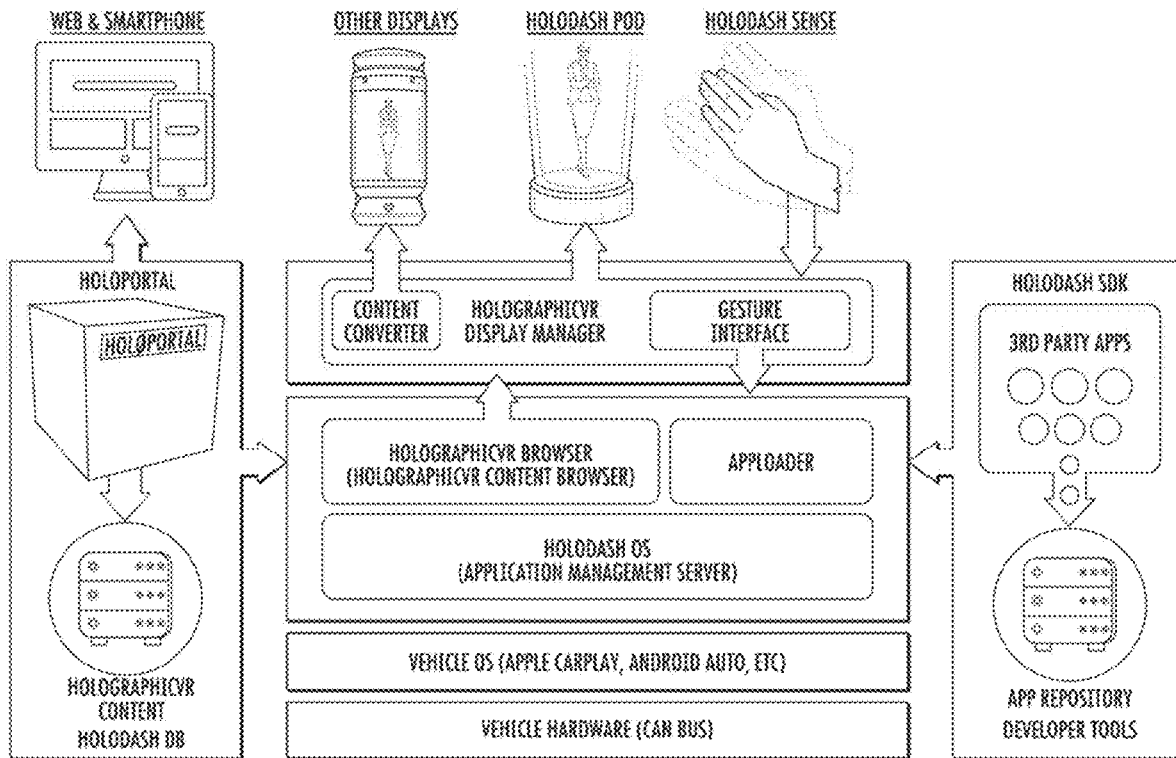
FIG. 1 shows a system block diagram for a vehicle onboard holographic communication system, in accordance with an embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The detailed description is presented largely in terms of description of shapes, configurations, and/or other symbolic representations that directly or indirectly resemble one or more vehicle onboard holographic communication systems and related methods of operation. These process descriptions and representations are the means used by those experienced or skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment. Furthermore, separate or alternative embodiments are not necessarily mutually exclusive of other embodiments. Moreover, the order of blocks in process flowcharts or diagrams representing one or more embodiments of the invention do not inherently indicate any particular order and do not imply any limitations in the invention.

One objective of an embodiment of the present invention is to provide a novel vehicle onboard holographic communication system that can generate, manage, and display various three-dimensional holographic objects, holographic digital assistance, and dynamically-updatable holographic contents in automotive infotainment, vehicle control, and communication environments.

Furthermore, another objective of an embodiment of the present invention is to provide a specialized in-dash holographic pod, a vehicle armrest holographic pod, or another in-vehicle holographic presentation platform that can display lifelike high-resolution holographic objects for driver and passenger infotainment, controls, and communication needs.

In addition, another objective of an embodiment of the present invention is to provide a novel user gesture-sensing holographic man-machine interface for enabling various gesture commands to holographic objects displayed inside a vehicle.

For the purpose of describing the invention, a term referred to as "hologram" is defined as an holographic object configured to be displayed from a holographic display pod or another holographic image presentation device. Typically, a hologram is capable of being animated as a three-dimensional element over a defined period of time. Examples of holograms utilized in automotive interior space environments include, but are not limited to, a humanized holographic in-dash assistant, a holographic butler configured to take user commands from drivers and passengers, and a holographic image of a call participant during a teleconference or a videoconference routed to a driver or a passenger of a vehicle.

Furthermore, for the purpose of describing the invention, a term referred to as "HoloDash" is defined as a vehicle onboard holographic communication system that includes at least one of an in-dash holographic display pod (e.g. "HoloDash Pod"), a holographic display manager unit, a holographic content browser, a hologram application loader, an in-vehicle hologram operating system, an application management server, a vehicle infotainment operating system, a vehicle infotainment communication bus interface, a hologram content creation system (e.g. "HoloPortal," "HoloCloud"), and a vehicle onboard hologram software development kit (e.g. "HoloDash SDK") for third party in-vehicle hologram applications.

In addition, for the purpose of describing the invention, a term referred to as "three-dimensional model," or "3D model," is defined as one or more computer-generated three-dimensional images, videos, or holograms. In a preferred embodiment of the invention, a computerized 3D model is created as a hologram after multi-angle video data are extracted, transformed, and reconstructed by three-dimensional graphics processing algorithms executed in a computer system or in a cloud computing resource comprising a plurality of networked and parallel-processing computer systems.

Moreover, for the purpose of describing the invention, a term referred to as "cloud" is defined as a scalable data network-connected and/or parallel-processing environment for complex graphics computations, transformations, and processing. The data network-connected and/or parallel-processing environment can be provided using a physical connection, a wireless connection, or both. For example, a cloud computing resource comprising a first cloud computing server, a second cloud computing server, and/or any additional number of cloud computing servers can each extract and transform a portion of multi-angle video data simultaneously as part of a scalable parallel processing algorithm, which performs temporal, spatial, and photometrical calibrations, and executes depth map computation, voxel grid reconstruction, and deformed mesh generation. A scalable number of cloud computing servers enables a real-time or near real-time transformation and reconstruction of 3D models after consumer video recording devices transmit multi-angle video data to the cloud computing resource.

Furthermore, for the purpose of describing the invention, a term referred to as "HoloPortal" is defined as a 3D model creation studio that incorporates cameras positioned on a multiple number of angles around a stage, where a target object is placed for video footage recording at the multiple number of angles around the stage. The 3D model creation studio also typically incorporates a real-time or near real-time 3D reconstruction electronic system, which is configured to perform silhouette extractions, 3D voxel generation, 3D mesh generation, and texture and detail-adding operations to create a user-controllable three-dimensional model that resembles the target object.

In addition, for the purpose of describing the invention, a term referred to as "HoloCloud" is defined as a novel electronic system that captures live multi-angle video feeds of a target object with portable electronic devices and generates a user-controllable three-dimensional model by performing various 3D reconstruction calculations and procedures in a scalable cloud computing network. In one example, a HoloCloud system comprises a plurality of common consumer-level video recording devices (e.g. smartphones, camcorders, digital cameras, etc.) positioned in various angles surrounding a target object (e.g. a human, an animal, a moving object, etc.), a scalable number of graphic processing units (GPU's) in a scalable cloud computing platform, a 3D pre-processing module, a 3D reconstruction module, a background 3D graphics content, a 360-degree virtual reality or video content, and a dynamic 3D model created by the 3D reconstruction module. In one embodiment, the 3D pre-processing module and the 3D reconstruction modules are graphics processing software executed in the scalable number of graphic processing units (GPU's). In another embodiment, these modules may be hard-coded specialized semiconductor chipsets or another hardware that operate in conjunction with the GPU's to provide 3D processing and reconstruction.

FIG. 1 shows a system block diagram (100) for a vehicle onboard holographic communication system, in accordance with an embodiment of the invention. In a preferred embodiment of the invention, the vehicle onboard holographic communication system comprises a vehicle infotainment hardware module, a vehicle infotainment operating system (e.g. Apple CarPlay, Android Auto, etc.) executed in a CPU and a memory unit of the vehicle infotainment hardware module, a vehicle onboard holographic communication operating system (e.g. "HoloDash OS") executed in the CPU and the memory unit of the vehicle infotainment hardware module, and a holographic display pod integrated into a vehicle dashboard or another part of the vehicle interior, as shown in FIG. 1. The vehicle infotainment operating system and the vehicle onboard holographic communication operating system may also be executed at least in part by an application management server in a cloud computing environment.

In one embodiment of the invention, the vehicle infotainment hardware module incorporates accelerated three-dimensional and holographic image display data processing capabilities with an onboard graphics processing unit (GPU), which is configured to generate autostereoscopic holograms in the holographic display pod. The vehicle infotainment hardware module may also incorporate a global positioning system (GPS) receiver, a GPS vehicle navigation processing unit, a cellular voice and data transceiver, a Bluetooth transceiver, and other electronic components for vehicle infotainment controls.

Furthermore, the vehicle onboard holographic communication system may also incorporate a holographic virtual reality browser and a third-party holographic application loader that are configured to load and display various holographic third-party in-vehicle apps by connecting to and downloading various software applications from a cloud-connected computer server, which executes a third-party holographic application database and/or an in-vehicle hologram software development kit (e.g. HoloDash SDK) for implementation and deployment of various in-vehicle holographic applications that can be utilized in an in-vehicle electronic interface environment. In one instance, "third-party" refers to a group of in-vehicle app developers who are not operated or owned by a vehicle manufacturer or a vehicle occupant. In another instance, "third-party" may include manufacturer-partnered or affiliated in-vehicle app developers. Preferably, the vehicle onboard holographic communication system also includes one or more specialized holographic 3D model creation apparatuses, such as HoloPortal and HoloCloud systems, that are configured to capture, synthesize, and transform various real-life objects and humanized figures into holographically-displayable datasets that can be utilized in creation of various in-vehicle hologram applications. Examples of real-life objects and humanized figures include, but are not limited to, in-vehicle virtual butlers, secretaries, narrators, conference call participants, and movie characters.

In the embodiment of the invention shown in the system block diagram (100) of FIG. 1, a specialized holographic 3D model creation apparatus (e.g. HoloPortal) may also be connected to a holographic virtual reality content database, a web browser, and/or a smartphone mobile app interface to upload or access a variety of holographic virtual reality contents for in-vehicle holographic displays. Furthermore, the vehicle onboard holographic communication system may also include a hologram content converter and a holographic virtual reality display manager to generate and display lifelike holograms on a holographic display pod in a vehicle dashboard, a center armrest, or another appropriate location inside the vehicle. Moreover, as shown in the system block diagram (100), the vehicle onboard holographic communication system may also incorporate a hologram-sensing gesture interface (e.g. "HoloDash Sense"), which is capable of detecting a user's hand or finger movements in mid-air to interact with a currently-displayed hologram in the holographic display pod.

In some embodiments of the invention, a hologram displayed by an in-vehicle holographic display pod is dynamically animated over time, with animation sequences dynamically changed and dependent upon user gesture command and voice command recognition capabilities provided by an underlying vehicular holographic application. In such embodiments, the underlying vehicular holographic application is configured to detect and listen to a driver's or a passenger's gesture and/or voice command to the hologram, and utilizes artificial intelligence to determine an appropriate holographic reaction to the gesture and/or voice command. For example, if the driver speaks a voice command called "butler," an in-vehicle virtual butler may appear as a hologram in an in-vehicle holographic display pod. Then, if the driver raises his index finger, the in-vehicle virtual butler may provide a visual and/or verbal update on the latest news from the driver's residence. The in-vehicle virtual butler, for example, may indicate when the driver's daughter has returned home from school this afternoon, or when a plumber is scheduled to come in to repair a bathroom fixture in the afternoon. If the plumber already repaired the bathroom fixture, the in-vehicle virtual butler, within the in-vehicle holographic display pod, may further present a holographic image of the repaired bathroom fixture that the plumber has uploaded from his smartphone to a HoloCloud server. In this example, the HoloCloud server converts the plumber's uploaded image of the repaired bathroom fixture into a hologram for subsequent transmission to the vehicle and presentation of the hologram via the in-vehicle virtual butler.

Figure 2:
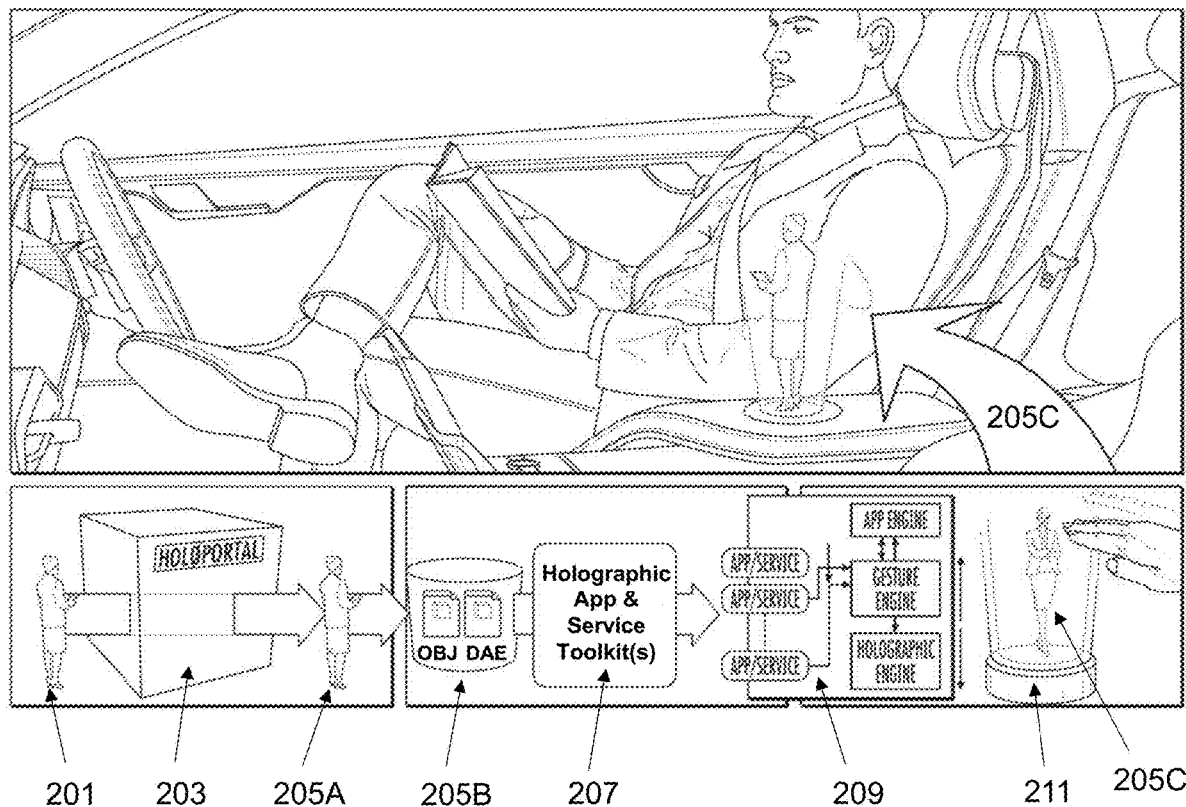
FIG. 2 shows a humanized three-dimensional holographic assistant on a holographic in-vehicle display device (e.g. "Holo Armrest Pod," "HoloDash Pod"), wherein the humanized three-dimensional holographic assistant is generated by a vehicle onboard holographic communication system, in accordance with an embodiment of the invention.

FIG. 2 shows a humanized three-dimensional holographic assistant (205C) on a holographic in-vehicle display device (e.g. "Holo Armrest Pod," "HoloDash Pod"), wherein the humanized three-dimensional holographic assistant is generated by a vehicle onboard holographic communication system (200), in accordance with an embodiment of the invention. In a preferred embodiment of the invention as shown in FIG. 2, the humanized three-dimensional holographic assistant (205C) may initially be created by a holographic image capture studio, such as the HoloPortal system (203), which is configured to capture a plurality of multi-angle images of a real-life human model (201) and generate a digitized holographic model content (205A). Typically, the creation of the digitized holographic model content (205A) involves eight or more time-synchronized multiple angle image captures of a targeted object, such as the real-life human model (201). The HoloPortal system (203) then executes a volumetric conversion of the eight or more time-synchronized multiple angle image captures to create the digitized holographic model content (205A), which can be controlled and choreographed as a hologram by an in-vehicle factory-spec or third-party hologram application.

Preferably, the HoloPortal system (203) or another holographic image capture studio is a component of the vehicle onboard holographic communication system (200), which provides proprietary or standardized holographic data compression of the digitized holographic model content (205A). In one example, the digitized holographic model content (205A) can be compressed and sub-divided (205B) as an object (OBJ) file and a digital asset exchange (DAE) file, wherein the OBJ file contains compressed multi-angle graphics data representing a particular holographic model, and wherein the DAE file contains digital graphics compatibility schemes and/or information, typically based on COLLADA (collaborative design activity) XML schema or another industry-standardized graphics compatibility scheme.

Then, as shown in FIG. 2, the compressed holographic model content files (e.g. OBJ and DAE files) can be utilized by one or more holographic app and service toolkits (207), such as WebGL, Unity, and Unreal Engine, by content creators to envision, generate, modify, and manage a variety of in-vehicle holographic applications and service offerings. In one example, the holographic app and service toolkits (207) may be connected to the rest of the vehicle onboard holographic communication system (200) via a cloud computing network and a wireless broadband network to provide downloading or uploading of various holographic in-vehicle applications to a targeted vehicle. In another example, at least some components of the holographic app and service toolkits (207) may be pre-installed or integrated into a HoloPortal system (203) or an in-vehicle infotainment or computing device to provide at least partially localized and/or factory-spec application execution experience in a particular vehicle.

Continuing with the embodiment of the invention as shown in FIG. 2, the vehicle onboard holographic communication system (200) also includes one or more application and service interfaces configured to load one or more in-vehicle holographic applications and service tools into an in-vehicle holographic device engine (209). In a preferred embodiment of the invention, the in-vehicle holographic device engine (209) may contain an application engine, a gesture engine, and a holographic engine. In one instance, the application engine is configured to execute coded instructions from a holographic application in a CPU/APU of a vehicle holographic display device to provide an immersive holographic application-specific environment inside a vehicle, while the gesture engine is configured to capture, interpret, and convert user gestures into specific hologram-to-user interaction commands. Furthermore, the holographic engine is configured to process three-dimensional hologram graphics data to create and display an animated hologram in a vehicle in-dash holographic pod, in a vehicle armrest holographic pod, or in another in-vehicle holographic display device.

In context of the embodiment of the invention as shown in FIG. 2, the animated hologram may be the humanized three-dimensional holographic assistant (205C) in a holographic in-vehicle display device (211), which may be the vehicle armrest holographic pod (i.e. "Holo Armrest Pod,"), the vehicle in-dash holographic pod (i.e. "HoloDash Pod"), or another in-vehicle holographic display device. In one example, the humanized three-dimensional holographic assistant (205C) may provide vehicle infotainment, communications, or control-related assistance to a driver or a passenger. In another example, the humanized three-dimensional holographic assistant (205C) may operate as a holographic virtual secretary or a holographic virtual butler to provide business, home, or family-related personalized assistance to the driver or the passenger. Yet in another example, the humanized three-dimensional holographic assistant (205C) may operate as an in-vehicle virtual entertainer or as a specialized holographic personality in an interactive movie or in another vehicle infotainment application.

Furthermore, in one embodiment of the invention, the driver or the passenger is able to utilize application-specific mid-air gesture commands near or into an animated hologram to interact with or instruct the animated hologram in a particular in-vehicle holographic application. Preferably, the animated hologram displayed by the holographic in-vehicle display device (211) does not distract the driver's attention to driving, and may be particularly useful in an autonomous or semi-autonomous driving environment that does not require the driver's full attention to current driving tasks or road conditions until the autonomous system warns the driver via visual and/or audio alerts.

Figure 3:
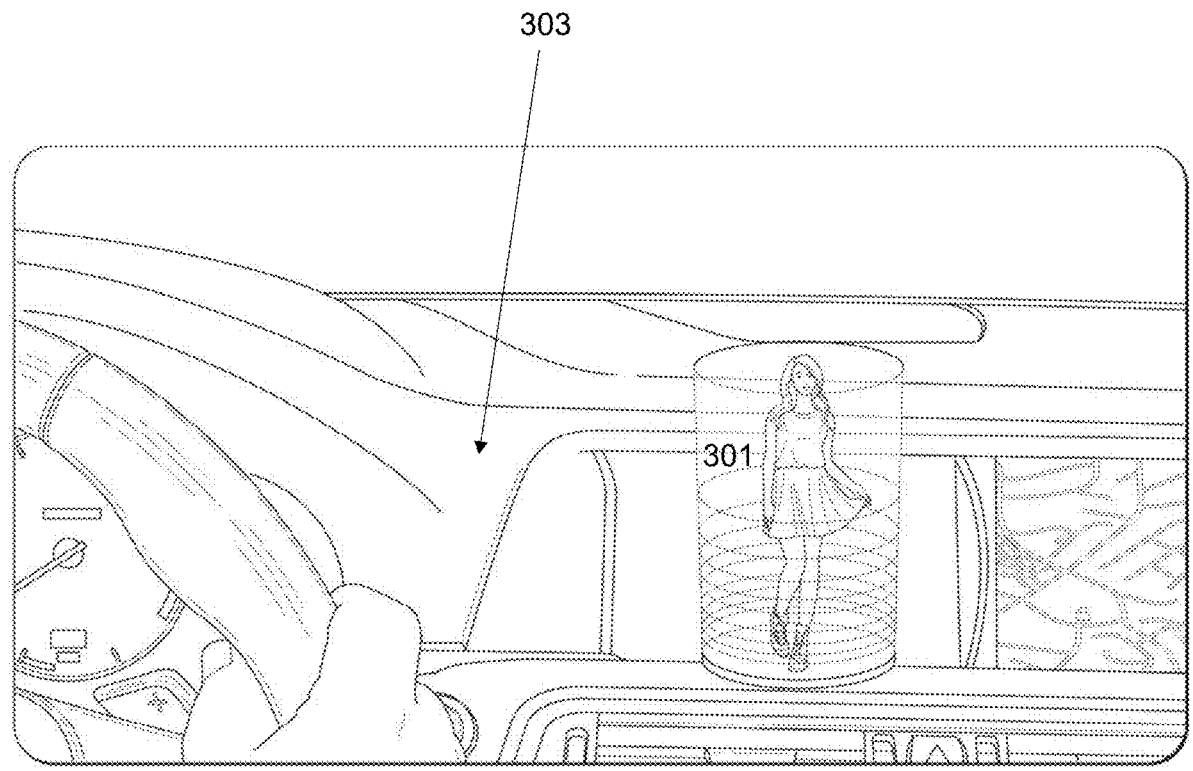
FIG. 3 shows a humanized three-dimensional holographic assistant in a holographic in-dash interface (e.g. "HoloDash Pod") generated by a vehicle onboard holographic communication system, in accordance with an embodiment of the invention.

FIG. 3 shows a humanized three-dimensional holographic assistant in a holographic in-dash interface (301) generated by a vehicle onboard holographic communication system, in accordance with an embodiment (300) of the invention. In this embodiment, the holographic in-dash interface (301) is called "HoloDash Pod" because the holographic display pod is integrated into a vehicle driver dashboard space (303), as shown in FIG. 3. The HoloDash Pod is capable of displaying any three-dimensional holographic objects animated over time, based on the contents presented by the currently-executed holographic in-vehicle application.

In one example, three-dimensional holographic objects may provide vehicle infotainment, communications, or control-related assistance to a driver or a passenger. In another example, one or more three-dimensional holographic objects may operate as a holographic virtual secretary or a holographic virtual butler to provide business, home, or family-related personalized assistance to the driver or the passenger. Yet in another example, one or more three-dimensional holographic objects may operate as an in-vehicle virtual entertainer or as a specialized holographic personality in an interactive movie or in another vehicle infotainment application.

Furthermore, some three-dimensional holographic objects are configured to interact directly with a driver's or a passenger's gesture command near or inside the holographic in-dash interface (301). For example, the humanized three-dimensional holographic assistant displayed in the HoloDash Pod, as shown in FIG. 3, is a three-dimensional holographic object that may be configured to recognize the driver's finger pinch-in (i.e. finger squeeze) and pinch-out (i.e. finger expansion) gestures. In one example, the humanized three-dimensional holographic assistant may construe the driver's finger pinch-in gesture as "closing" or "exiting" a current action item from additional discussion or narration.

Similarly, the humanized three-dimensional holographic assistant may construe the driver's finger pinch-out gesture as requesting more details or additional elaboration for the current action item undergoing discussion or narration.

Figure 4:
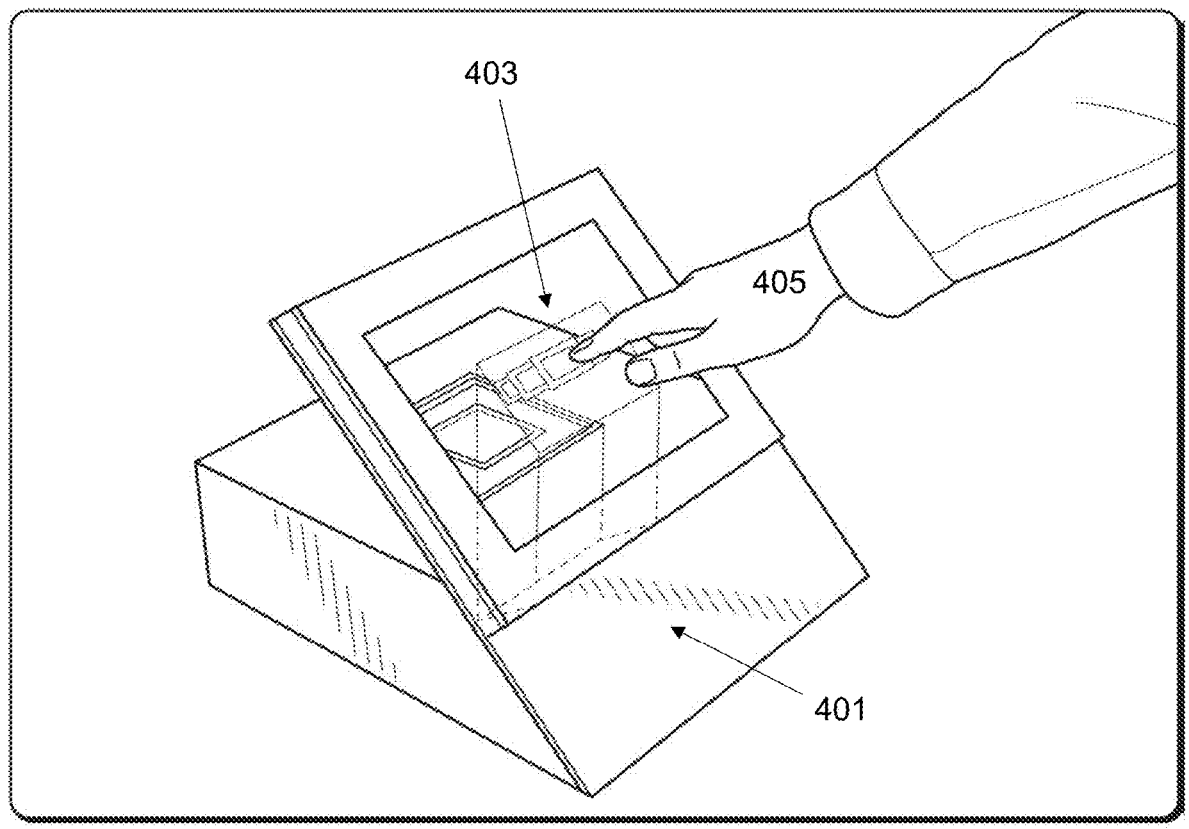
FIG. 4 shows a holographic sensing-based user control interface (e.g. "HoloDash Sense") for a vehicle onboard holographic communication system, in accordance with an embodiment of the invention.

FIG. 4 shows a holographic sensing-based user control interface (403) for a vehicle onboard holographic communication system, in accordance with an embodiment (400) of the invention. In this example, the holographic sensing-based user control interface (403) is implemented on a three-dimensional holographic pod (401), which is configured to detect and interact with a user's hand gestures (405), including hand or finger depth-gestures into a hologram, as shown in FIG. 4. The holographic sensing-based user control interface (403) comprises a hologram that is designed, pre-configured, and controlled by an in-vehicle holographic application that utilizes an ultrasonic position sensor, a radar-based position sensor, an electrical field detection-based position sensor, a capacitive position sensor, or a combination thereof in the three-dimensional holographic pod (401) to detect the user's current hand/finger positions or gestures near or into particular areas of the currently-displayed hologram.

If the user's current hand/finger positions or gestures match correctly with the pre-configured holographic interface commands recognized by the in-vehicle holographic application, then one or more commands associated with the user's current hand/finger positions or gestures are executed and reflected in the hologram or in the related multimedia contents. For example, if the hologram comprises a holographic movie play control panel, including a "play movie" button, a "rewind" button, a "fast forward" button, and a "stop" button, and if the user presses his finger(s) into the "fast forward" button portion of the hologram, then the holographic sensing-based user control interface (403) is able to detect the user's button-pressing gesture in the current three-dimensional coordinates corresponding to the currently-displayed "fast forward button," and change the multimedia contents associated with the hologram accordingly (i.e. fast-forwarding the holographic movie, etc.).

Preferably, specific interactions between holograms and user gestures in the holographic sensing-based user control interface (403) can be dynamically defined, modified, and managed by a particular in-vehicle holographic application, which is empowered to determine real-time user hand or finger positions relative to a displayable hologram in the three-dimensional holographic pod (401). Various three-dimensional user gesture position sensors, such as ultrasonic position sensors, radar-based position sensors, electrical field detection-based position sensors, and/or capacitive position sensors can be integrated into or installed near the casing of the three-dimensional holographic pod (401) to provide accurate real-time three-dimensional (i.e. horizontal, vertical, and depth) sensing of user hand or finger movements. In one embodiment of the invention, the holographic sensing-based user control interface (403) may be called a "HoloDash Sense" apparatus because it is integrated into a vehicle dashboard for real-time user gesture-sensing command capabilities for in-vehicle hologram applications.

Figure 5:
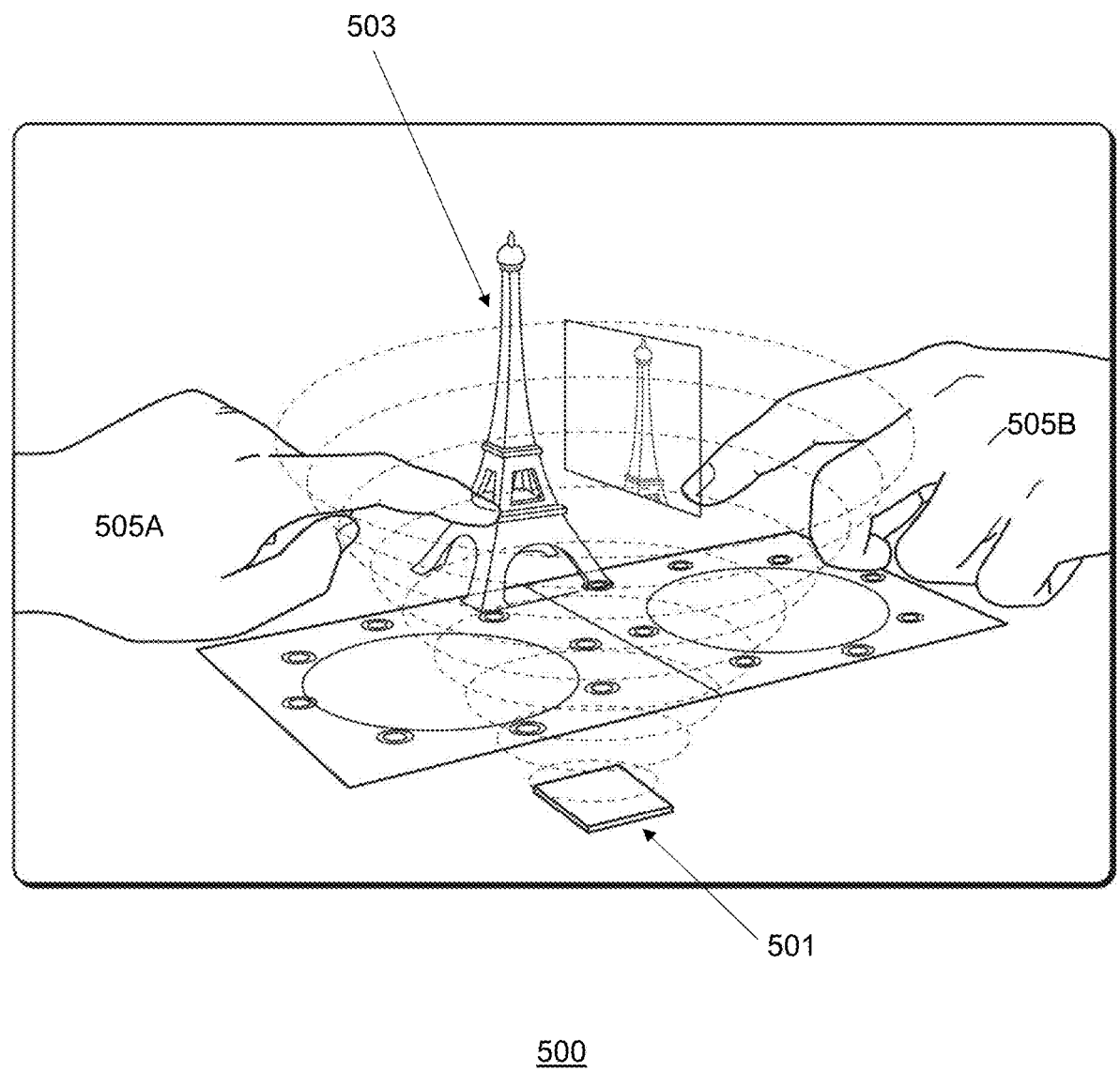
FIG. 5 shows another holographic sensing-based user control interface (e.g. "HoloDash Sense") for a vehicle onboard holographic communication system, in accordance with an embodiment of the invention.

FIG. 5 shows another holographic sensing-based user control interface (503) for a vehicle onboard holographic communication system, in accordance with an embodiment (500) of the invention. In this example, the holographic sensing-based user control interface (503) is implemented on an in-vehicle holographic pod, which is configured to detect and interact with a user's hand or finger gestures (505A, 505B), including hand or finger depth-gestures into a hologram displayed on the in-vehicle holographic pod that incorporates the holographic sensing-based user control interface (503), as shown in FIG. 5. The holographic sensing-based user control interface (503) is configured to display a hologram designed, pre-configured, and controlled by an in-vehicle holographic application that utilizes an ultrasonic position sensor, a radar-based position sensor, an electrical field detection-based position sensor, a capacitive position sensor, or a combination thereof to detect the user's current hand/finger positions or gestures near or into particular areas of the currently-displayed hologram.

In the example shown in FIG. 5, a radar-based position sensor (501) is located underneath or near the in-vehicle holographic pod. The radar-based position sensor (501) emits radio waves and interprets reflection or distortion of the emitted radio waves caused by the user's hand or finger movements near the currently-displayed hologram to translate the radio wave reflection signatures into specific user gesture commands that are pre-configured by the in-vehicle holographic application. If the user's current hand/finger positions or gestures match correctly with the pre-configured holographic interface commands recognized by the in-vehicle holographic application, then one or more commands associated with the user's current hand/finger positions or gestures are executed and reflected in the hologram or in the related multimedia contents.

For example, as shown in the embodiment (500) in FIG. 5, the hologram may be a holographic tower, which embeds "rotate clockwise," "rotate counterclockwise," "zoom-in," and "zoom-out" gesture command interpretation capabilities near or inside the hologram. If the user makes an over-the-air counterclockwise hand or finger gesture around the holographic tower, then the holographic sensing-based user control interface (503) is able to detect the user's counterclockwise hand or finger gesture, and may signal the in-vehicle holographic application to rotate the holographic tower counterclockwise. Furthermore, in this example, the magnitude of the counterclockwise rotation may be directly correlated and determined by the magnitude of the over-the-air counterclockwise motion from the user's hand(s) or finger(s) around the holographic tower.

In this embodiment (500) of the invention, specific interactions between holograms and user gestures in the holographic sensing-based user control interface (503) can be dynamically defined, modified, and managed by a particular in-vehicle holographic application, which is empowered to determine real-time user hand or finger positions relative to a displayable hologram on the in-vehicle holographic pod. Various three-dimensional user gesture position sensors, such as the radar-based position sensor (501) as shown in FIG. 5, or ultrasonic, e-field, and/or capacitive position sensors may be integrated into or installed near the casing of the in-vehicle holographic pod to provide accurate real-time three-dimensional (i.e. horizontal, vertical, and depth) sensing of user hand or finger movements. In this embodiment (500) of the invention, the holographic sensing-based user control interface (503) may be called a "HoloDash Sense" apparatus, if its corresponding in-vehicle holographic pod is integrated into a vehicle dashboard for real-time user gesture-sensing command capabilities for in-vehicle hologram applications.

Figure 6:
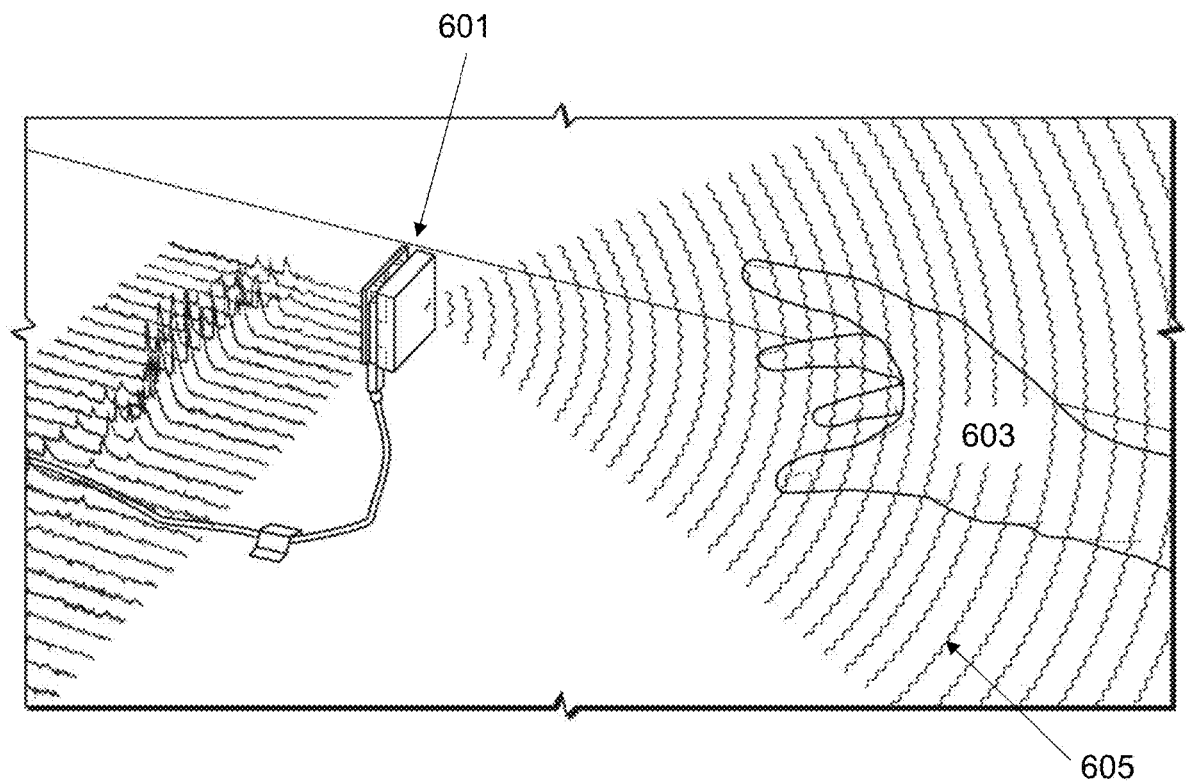
FIG. 6 shows a three-dimensional gesture-sensing method for a holographic sensing-based user control interface (e.g. "HoloDash Sense") in a vehicle onboard holographic communication system, in accordance with an embodiment of the invention.

FIG. 6 shows an example (600) of a three-dimensional gesture-sensing method for a holographic sensing-based user control interface (e.g. "HoloDash Sense") in a vehicle onboard holographic communication system, in accordance with an embodiment of the invention. This example (600) shows a radar-based position sensor (601), which is configured to emit radio waves (605) and to interpret reflection(s)

or distortion(s) of the emitted radio waves caused by the user's hand or finger movements (603) near the currently-displayed hologram to translate the radio wave reflection signatures into electrical signals. The electrical signals are then compared against predefined electrical signal patterns that correspond to specific user gesture commands, which have been initially defined by an in-vehicle holographic application. If the electrical signal comparison results in a positive match, then one or more commands associated with the specific user gesture commands are executed and reflected in the hologram or in the related multimedia contents.

The holographic sensing-based user control interface is capable of detecting the magnitude of the user's hand or finger gestures, and may inform the in-vehicle holographic application to determine and configure a corresponding level of the user gesture command, if the user gesture command involves predefined magnitudes. For example, if the user gesture command is to zoom-out of a current view of the hologram, or to rotate the hologram clockwise, the magnitude of the user's hand or finger gestures may set the zoom-out level or the amount of clockwise rotation for the hologram.

Figure 7:
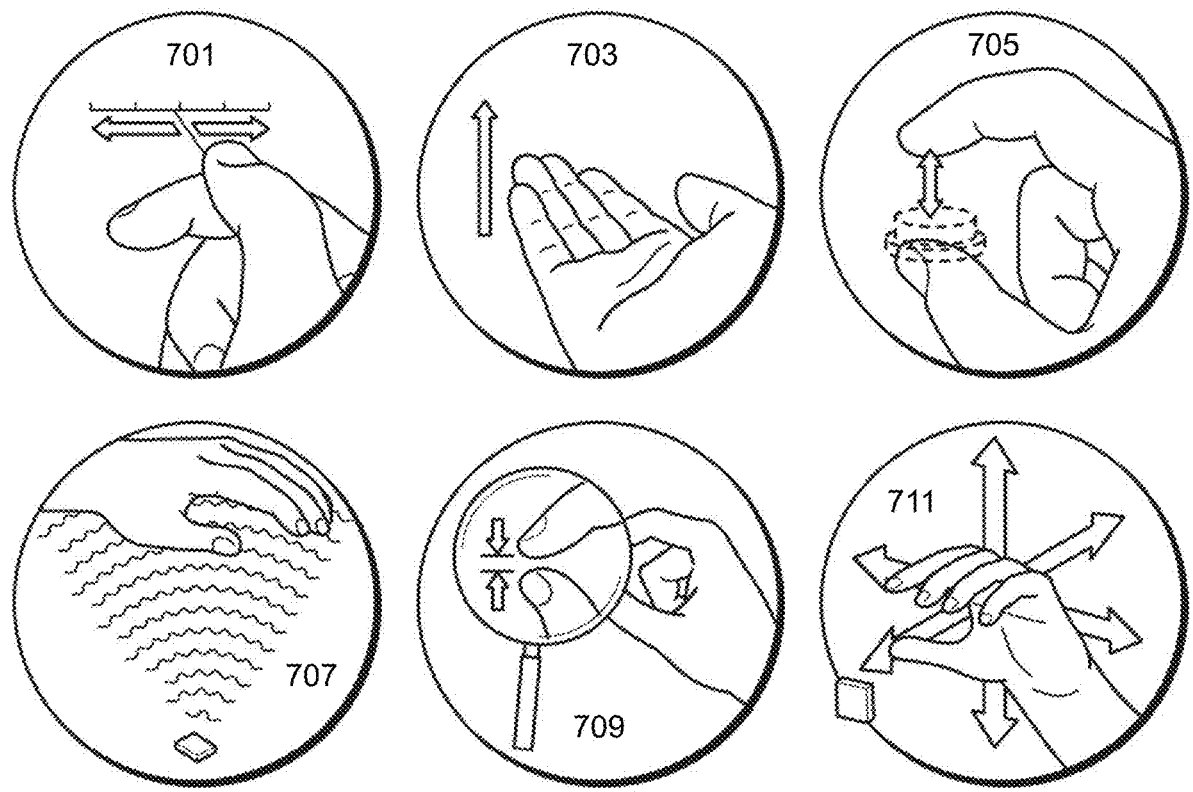
FIG. 7 shows examples of three-dimensional gesture-sensing functionalities for a holographic sensing-based user control interface (e.g. "HoloDash Sense") in a vehicle onboard holographic communication system, in accordance with an embodiment of the invention.

FIG. 7 shows examples of three-dimensional gesture-sensing functionalities (700) for a holographic sensing-based user control interface (e.g. "HoloDash Sense") in a vehicle onboard holographic communication system, in accordance with an embodiment of the invention. In this example, the three-dimensional gesture-sensing functionalities may include, but are not limited to, sliding a hologram left or right with a horizontal finger/hand gesture command (701), raising or lowering the hologram with a vertical finger/hand gesture command (703), pressing a holographic button with a finger-squeeze gesture command (705), sensing the user hand-to-hologram proximity by utilizing a radar-based position sensor (707), zooming the hologram in or out with a finger-expanding or finger-squeezing gesture command (709), and controlling hologram orientation or directions with a directional finger or hand gesture command (711).

In other embodiments of the invention, the holographic sensing-based user control interface may utilize one or more ultrasonic position sensors, radar-based position sensors, electrical field detection-based position sensors, capacitive position sensors, or a combination thereof to detect the user's current hand/finger positions or gestures near or into particular areas of the currently-displayed hologram. Furthermore, in other embodiments of the invention, user finger or hand gestures may be defined, implemented, and recognized by an in-vehicle holographic application for a variety of other user commands in the currently-displayed hologram.

In one embodiment of the invention, a rapid three-dimensional holographic model generation from a dedicated real-time model reconstruction studio with multiple camera angles may be utilized as a component of a vehicle onboard holographic communication system. In a preferred embodiment of the invention, the dedicated real-time model reconstruction studio with multiple camera angles is called "HoloPortal." HoloPortal is a 3D model creation studio with a real-time or near real-time 3D reconstruction system. This 3D model creation studio is configured to place a target object (e.g. a human, an animal, or another moving object) in a designated area of the 3D model creation studio that positions a plurality of cameras in various angles around the designated area to capture multi-angle video footages of the target object. Then, the multi-angle video footages are processed, transformed, and reconstructed as dynamic 3D models, which may include 3D mesh models, textures for all related frames, and movement frames associated with the target object. After the dynamic 3D models, also called herein as "3D body doubles" are generated from the HoloPortal, the dynamic 3D models can be stored in a 3D model database for in-vehicle or other holographic applications. The HoloPortal may be dynamically linked to an electronic social platform for sharing, monetizing, and viewing a variety of dynamic 3D models stored in the 3D model database. These dynamic 3D models may be generated in 3D model formats such as OBJ's and/or COLLADA's.

In one example, HoloPortal first records multi-angle videos from a multiple number of cameras surrounding the designated area. Then, the multi-angle videos undergo silhouette extractions, 3D voxel generation, 3D mesh generation, deformed 3D mesh generation, and texture-on-mesh generation to create a 3D model, or a "3D body double" model through a variety of data transformations and graphics reconstructions executed on graphics processing units incorporated in or associated with the HoloPortal. Preferably, the HoloPortal can generate 3D models (e.g. "3D body doubles") and 3D contents in real-time or near real-time, without lengthy and laborious conventional methods of 3D content generation processes that can take many hours to many months. Furthermore, the 3D models generated from the HoloPortal can be utilized in as characters of a 3D computerized game, a 3D animation movie, an augmented reality application, a virtual reality application, or an in-vehicle holographic application. For example, a holographic 3D model (e.g. a "three-dimensional (3D) body double" model created after the multi-angle video capture of a human figure) may be created and displayed in an in-dash holographic pod as a holographic butler or an infotainment assistant. Moreover, in some embodiments of the invention, a computerized 3D model created from the HoloPortal may also be physically manufactured with a 3D printing machine located within or outside the HoloPortal for commercial, promotional, business, or transactional purposes.

Furthermore, the vehicle onboard holographic communication system may utilize another component called "HoloCloud" for creation of a three-dimensional holographic model, instead of or in combination with the HoloPortal. The HoloCloud system provides a rapid three-dimensional model generation process from uncalibrated multiple sources of video recording of a targeted object and subsequent cloud computing-based video data calibration and three-dimensional reconstruction of the targeted object. Typically, the HoloCloud system comprises a plurality of common consumer-level video recording devices (e.g. smartphones, camcorders, digital cameras, etc.) positioned in various angles surrounding a target object (e.g. a human, an animal, a moving object, etc.), a scalable number of graphic processing units (GPU's) in a scalable cloud computing platform, a 3D pre-processing module, a 3D reconstruction module, a background 3D graphics content, a 360-degree virtual reality or video content, and a dynamic 3D model created by the 3D reconstruction module.

The plurality of common consumer-level video recording devices generate a plurality of digitized video feeds (e.g. Video 1, Video 2, . . . Video n) in various angles for a target object, and then utilizes an integrated or standalone wireless transceiver (e.g. a cellular transceiver, a WiFi LAN transceiver, etc.) to transmit the plurality of digitized video feeds to a HoloCloud graphics processing unit (GPU) in a cloud computing platform. In a preferred embodiment, the HoloCloud GPU incorporates a pre-processing module and a 3D reconstruction module. The pre-processing module is configured to calibrate temporal, spatial, and photometrical variables of the multi-angle digitized video feeds, and is also able to generate background 3D geometry and 360-degree virtual reality video. The 3D reconstruction module is configured to provide depth map computations, voxel grid reconstructions, and deformed mesh generations for eventual generation of dynamic 3D models. After numerous internal stages of video extractions, transformations, and reconstruction through the HoloCloud GPU, the background 3D graphics content, the 360-degree virtual reality or video content, and the dynamic 3D models are electronically generated and subsequently utilized as 3D figures, graphics, or holograms in in-vehicle hologram applications, virtual reality applications, augmented reality applications, or 3D printing applications for physical 3D model manufacturing.

Pre-processing and reconstruction procedures for the HoloCloud system require cloud computing-based video data calibration and three-dimensional reconstructions of a targeted object, in accordance with an embodiment of the invention. A multiple number of common consumer-level video recording devices generates a plurality of digitized video feeds (e.g. Video 1, Video 2, . . . Video n) in various angles for a target object, and then transmit the plurality of digitized video feeds to a HoloCloud graphics processing unit (GPU) in a cloud computing platform. Typically, the cloud computing platform is a collective number of graphics computing machines that are dynamically scalable to deploy and assign a flexible number of GPU's for parallel processing, depending on the intensity of graphics computation, transformation, and reconstruction requirements for the plurality of digitized video feeds. For example, a larger number of GPU's may be assigned to perform 3D graphics processing if the plurality of digitized video feeds has a high video feed count, long durations, and/or higher resolutions. In contrast, a smaller number of GPU's may be assigned to perform 3D graphics processing if the plurality of digitized video feeds has a low video feed count, short durations, and/or lower resolutions.

In cloud computing-based video data calibration and three-dimensional reconstructions of the targeted object, each HoloCloud GPU can incorporate a pre-processing module and a 3D reconstruction module. The pre-processing module executes calibration of temporal, spatial, and photometrical variables of the multi-angle digitized video feeds, and is also able to generate background 3D geometry and 360-degree virtual reality video. The 3D reconstruction module, on the other hand, performs depth map computations, voxel grid reconstructions, and deformed mesh generations for eventual generation of dynamic 3D models or characters.

After numerous internal stages of video extractions, transformations, and reconstruction through one or more HoloCloud GPU's that are typically configured to scale and parallel-process a varying amount of workload for 3D content generation, the background 3D geometry graphics content, the 360-degree virtual reality video content, and the dynamic 3D model are electronically generated and subsequently utilized as 3D figures or graphics in an in-vehicle hologram application, in a virtual reality application, in an augmented reality application, or in a 3D printing of a physical 3D model made of plastic, rubber, or metallic composite materials. The HoloCloud system, which utilizes a plurality of common consumer-level video recording devices for multi-angle video feeds of a target object and a scalable number of HoloCloud GPU's for video extractions, transformations, and reconstruction of dynamic 3D models, enables casual (i.e. non-technical or not technically skillful) consumers to be professional-level 3D content creators, who are able to capture and generate 3D graphics contents rapidly and inexpensively without necessitating specialized 3D content recording equipment and/or high-powered 3D graphics computing equipment on site that are typically required in conventional 3D content generation.

Furthermore, by wirelessly transmitting the recorded multi-angle video feeds to a scalable number of HoloCloud GPU's executed in a cloud computing network that processes high-powered graphics computing tasks to generate dynamic 3D models, a casual content creator is not required to have an expert knowledge of 3D graphics pre-processing and reconstruction processes that may be electronically executed by a third-party HoloCloud service operator. Therefore, various embodiments of the present invention enable convenient and pervasive casual user-created dynamic 3D hologram models and 3D contents, which were previously difficult to generate with conventional 3D content generation solutions.

In order to initiate creation of holographic contents for in-vehicle hologram applications, two methods of ubiquitous and rapid three-dimensional model content generation and robust social sharing of holographic contents by casual (i.e. non-graphics expert) consumers can be utilized in accordance with various embodiments of the invention. A first method of ubiquitous and rapid three-dimensional model content generation involves a dedicated 3D content generation studio (i.e. "HoloPortal") that allows a casual consumer to walk into a HoloPortal facility to capture multi-angle video feeds from professionally-installed multiple cameras surrounding a targeted area in the HoloPortal for a dynamic 3D model generation from onsite graphics processing units. On the other hand, a second method of ubiquitous and rapid three-dimensional model content generation involves a plurality of consumer cameras at any location of a casual consumer's choice to capture multi-angle video feeds around a target object, wherein the multi-angle video feeds are subsequently transmitted to a cloud computing resource specializing in 3D graphics processing to generate a dynamic 3D model. As described previously, this second method of the dynamic 3D model generation is called "HoloCloud."

Once dynamic 3D hologram models are generated by a HoloPortal system or a HoloCloud system, they can be incorporated or synthesized into various electronic applications, such as in-vehicle holographic applications, virtual reality applications, augmented reality applications, 3D animation movies, and 3D-printed physical 3D models. For example, a dynamic 3D hologram model can be displayed as an in-vehicle holographic assistant displayed by an in-dash holographic display pod. In another example, the dynamic 3D hologram model may also be displayed in a wearable computing device, such as a virtual reality goggle or a hologram display projector. Yet in another example, a physical 3D model made of plastic, metallic, or composite materials may be created by a 3D printer. Furthermore, the dynamic 3D models can be uploaded, listed, and shared on an electronic 3D model and content sharing platform that connects content creators, distributors, service providers, and content viewers. The electronic 3D model and content sharing platform may also provide paid viewing as well as complimentary viewing features based on content access permission parameters configured by the content creators and/or the distributors.

Various embodiments of vehicle onboard holographic communication systems and related methods of operating such systems described herein provide significant advantages to conventional automotive infotainment and in-car communication capabilities. For instance, a novel vehicle onboard holographic communication system, implemented in accordance with an embodiment of the invention, is able to create, share, and direct various three-dimensional holographic objects, holographic digital assistance, and dynamically-updatable holographic contents inside a vehicle to provide visually-immersive and intuitive infotainment and communication environment to vehicle occupants.

Furthermore, various factory-spec and third-party in-vehicle holographic applications that can be executed by the vehicle onboard holographic communication system significantly diversify and enhance vehicle occupant entertainment offerings and in-vehicle teleconferencing or videoconferencing communication experiences. Such in-vehicle holographic applications executed in the vehicle onboard holographic communication system can also improve efficiency and productivity of the vehicle occupants by providing in-car holographic assistants or in-car holographic butlers, who are capable of three-dimensional presentation of professional or personal information that are securely retrieved from a cloud server or an in-car local data storage.

Moreover, by integrating a novel in-dash holographic pod, a novel vehicle armrest holographic pod, or another in-vehicle holographic presentation platform at least in some embodiments of the invention, the vehicle onboard holographic communication system is able to present lifelike high-resolution holographic objects for driver and passenger infotainment, vehicle controls, and communication needs.

In addition, by incorporating a novel user gesture-sensing holographic man-machine interface for various user-triggered gesture commands to a currently-displayed hologram on a vehicle dash, a vehicle armrest, or another appropriate in-car location, the vehicle onboard holographic communication is able to provide a three-dimensional interactive experience with a vehicle holographic assistant, a vehicle butler, or another hologram presented to vehicle occupants by an in-vehicle holographic application.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the claims.

What is claimed is:

1. A vehicle onboard holographic communication system comprising:
   a vehicle infotainment hardware module comprising a central processing unit (CPU) and a memory unit;
   a vehicle infotainment operating system executed in the CPU and the memory unit of the vehicle infotainment hardware module;
   a vehicle onboard holographic communication operating system executed in the CPU and the memory unit of the vehicle infotainment hardware module, wherein the vehicle infotainment operating system and the vehicle onboard holographic communication operating system are at least partially executed by a holographic application management server in a cloud computing environment;
   a holographic display pod device integrated into at least one of a vehicle dashboard and a vehicle armrest;
   a hologram content converter and a holographic virtual reality display manager to generate and display holograms on the holographic display pod device integrated into the vehicle dashboard or the vehicle armrest;
   a holographic virtual reality content browser and a third-party holographic application loader that are configured to load and display various holographic in-vehicle apps downloaded from a third-party holographic application database and an in-vehicle holographic software development kit (SDK) in the cloud-computing environment; and
   a three-dimensional (3D) holographic in-vehicle virtual butler that dynamically tracks a driver's residential and maintenance repair work status and the driver's family member entry or exit from the driver's residence, and alerts the driver with a residential housekeeping hologram transmitted via a holographic image-synthesizing cloud-computing server, when the driver summons the 3D holographic in-vehicle virtual butler by a voice or gesture command to appear on the holographic display pod device integrated into the vehicle dashboard or the vehicle armrest.

2. The vehicle onboard holographic communication system of claim 1, further comprising a holographic virtual reality content database, and at least one of a web browser and a smartphone mobile app interface to upload or access various holographic virtual reality contents for in-vehicle holographic displays.

3. The vehicle onboard holographic communication system of claim 1, further comprising a hologram-sensing gesture interface and at least one of an ultrasonic position sensor, a radar-based position sensor, an electrical field detection-based position sensor, and a capacitive position sensor, which are configured to detect a user's hand or finger gestures in mid-air near or into the 3D holographic in-vehicle virtual butler to enable the 3D holographic in-vehicle virtual butler to interact directly with the user's hand or finger gestures in mid-air.

4. The vehicle onboard holographic communication system of claim 1, further comprising an onboard graphics processing unit (GPU) that provides accelerated three-dimensional and holographic image display data processing capabilities to generate autostereoscopic holograms in the holographic display pod device.

5. The vehicle onboard holographic communication system of claim 1, wherein the vehicle infotainment operating system is compatible to mobile phone operating system requirements.

6. The vehicle onboard holographic communication system of claim 1, wherein the vehicle onboard holographic communication operating system is based on a proprietary vehicle in-dash hologram operating system configured specifically to generate, manage, and display the 3D holographic in-vehicle virtual butler controlled by one or more holographic in-vehicle apps.

7. The vehicle onboard holographic communication system of claim 2, further comprising a holographic 3D model creation studio operatively connected to the holographic virtual reality content database and at least one of the web browser, the smartphone mobile app interface, and the holographic virtual reality content browser, wherein the holographic 3D model creation studio generates a new holographic model object file from multi-angle time-synchronized images of a human or another target object, and then uploads the new holographic model object file to the holographic virtual reality content database for subsequent access by the web browser, the smartphone mobile app interface, and the holographic virtual reality content browser.

* * * * *